US011755433B2

(12) United States Patent
Chopra et al.

(10) Patent No.: US 11,755,433 B2
(45) Date of Patent: Sep. 12, 2023

(54) METHOD AND SYSTEM FOR HEALTH RANK BASED VIRTUAL MACHINE RESTORATION USING A CONFORMAL FRAMEWORK

(71) Applicant: EMC IP Holding Company LLC, Hopkinton, MA (US)

(72) Inventors: Shelesh Chopra, Bangalore (IN); Mahantesh M. Ambaljeri, Bangalore (IN); Rahul Deo Vishwakarma, Bangalore (IN); Gopal Singh, Pleasantville, CA (US); Parmeshwr Prasad, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 17/131,450

(22) Filed: Dec. 22, 2020

(65) Prior Publication Data

US 2022/0197762 A1    Jun. 23, 2022

(51) Int. Cl.
*G06F 11/20*    (2006.01)
*G06F 9/455*    (2018.01)
*G06N 20/00*    (2019.01)

(52) U.S. Cl.
CPC ........ *G06F 11/203* (2013.01); *G06F 9/45558* (2013.01); *G06F 11/2025* (2013.01); *G06F 2009/45591* (2013.01); *G06F 2009/45595* (2013.01); *G06F 2201/815* (2013.01); *G06N 20/00* (2019.01)

(58) Field of Classification Search
CPC .............. G06F 11/203; G06F 11/2025; G06F 11/1484; G06F 11/301; G06F 11/3409; G06F 11/3055; G06F 9/45558; G06F 2009/45591; G06F 2009/45595; G06F 2201/815; G06N 20/00
See application file for complete search history.

(56) References Cited

U.S. PATENT DOCUMENTS

| 9,367,379 | B1 | 6/2016 | Burke et al. | |
|---|---|---|---|---|
| 9,804,890 | B1* | 10/2017 | Pai | ........................ G06F 9/5077 |
| 10,133,619 | B1* | 11/2018 | Nagpal | ................. G06F 11/079 |
| 10,331,524 | B2 | 6/2019 | Formato et al. | |
| 10,628,225 | B2 | 4/2020 | Yamato | |
| 10,769,007 | B2* | 9/2020 | Chintalapati | ....... G06F 11/0751 |
| 11,277,431 | B2 | 3/2022 | Trivellato et al. | |
| 2002/0143914 | A1 | 10/2002 | Cihula | |

(Continued)

*Primary Examiner* — Matthew M Kim
*Assistant Examiner* — Matthew N Putaraksa
(74) *Attorney, Agent, or Firm* — Chamberlain, Hrdlicka, White, Williams & Aughtry (57) ABSTRACT

A method and system for health rank based virtual machine restoration using a conformal framework. With respect to enterprise data protection, solutions need to address two primary responsibilities: at the onset of failure or disaster, restore any running applications, as well as any lost or damaged data; and minimize (if not eliminate) the future occurrence of such failures or disasters. In tackling the latter responsibility, the disclosed method and system leverage health-score assessments to ensure the restoration of virtual machines onto healthy infrastructure. The aforementioned health-score assessments employ clustering to identify, and a conformal framework to rank, healthy hosts onto which virtual machines may be restored.

16 Claims, 3 Drawing Sheets

(56) References Cited

U.S. PATENT DOCUMENTS

| | | | | |
|---|---|---|---|---|
| 2015/0249615 | A1* | 9/2015 | Chen | G06F 9/45558 709/226 |
| 2016/0103698 | A1* | 4/2016 | Yang | G06F 11/1658 718/1 |
| 2016/0103728 | A1* | 4/2016 | Shetty | G06F 9/45558 714/57 |
| 2016/0371153 | A1* | 12/2016 | Dornemann | G06F 11/1458 |
| 2017/0149807 | A1* | 5/2017 | Schilling | G06F 21/53 |
| 2018/0165166 | A1* | 6/2018 | Wang | G06F 11/2033 |
| 2018/0183750 | A1* | 6/2018 | Wang | H04L 61/103 |
| 2018/0260261 | A1* | 9/2018 | Mohammed | G06F 11/008 |
| 2020/0026625 | A1* | 1/2020 | Konka | G06F 11/2028 |
| 2020/0133739 | A1* | 4/2020 | Jain | G06F 9/5077 |
| 2020/0177458 | A1* | 6/2020 | Rahman | H04L 43/16 |
| 2020/0225970 | A1* | 7/2020 | Mohanta | G06F 9/45558 |
| 2020/0364117 | A1* | 11/2020 | Enakiev | G06F 11/142 |
| 2021/0103507 | A1* | 4/2021 | Pfister | G06F 11/2048 |
| 2021/0182093 | A1* | 6/2021 | Soryal | H04L 43/0876 |
| 2021/0208983 | A1* | 7/2021 | Lin | G06N 3/08 |
| 2022/0004431 | A1* | 1/2022 | Doudali | G06F 9/45533 |
| 2022/0091915 | A1* | 3/2022 | Perneti | G06F 3/0629 |
| 2022/0129504 | A1* | 4/2022 | Bi | G06F 16/906 |
| 2022/0215273 | A1* | 7/2022 | Sethi | G06N 5/04 |
| 2022/0229679 | A1* | 7/2022 | Mutha | G06F 9/45558 |
| 2022/0318041 | A1* | 10/2022 | Perneti | G06F 9/5005 |
| 2022/0400060 | A1* | 12/2022 | Sethi | H04L 43/0817 |

* cited by examiner

METHOD AND SYSTEM FOR HEALTH RANK BASED VIRTUAL MACHINE RESTORATION USING A CONFORMAL FRAMEWORK

BACKGROUND

With respect to enterprise data protection, solutions need to address two primary responsibilities: at the onset of failure or disaster, restore any running applications, as well as any lost or damaged data; and minimize (if not eliminate) the future occurrence of such failures or disasters.

SUMMARY

In general, in one aspect, the invention relates to a method for virtual machine restoration. The method includes detecting a failure of a source virtual machine, in response to detecting the failure, identifying a set of available virtual machines, ranking, in descending order and to obtain a ranked subset of available virtual machines, a subset of the set of available virtual machines based on a health score calculated for each available virtual machine in the subset of the set of available virtual machines, selecting a target virtual machine from the ranked subset of available virtual machines, and restoring, onto the target virtual machine, at least a defined process once hosted on the source virtual machine, wherein the health score calculated for each available virtual machine in the subset of the set of available virtual machines is provided using a conformal framework.

In general, in one aspect, the invention relates to a non-transitory computer readable medium (CRM). The non-transitory CRM includes computer readable program code, which when executed by a computer processor, enables the computer processor to detect a failure of a source virtual machine, in response to detecting the failure, identify a set of available virtual machines, rank, in descending order and to obtain a ranked subset of available virtual machines, a subset of the set of available virtual machines based on a health score calculated for each available virtual machine in the subset of the set of available virtual machines, select a target virtual machine from the ranked subset of available virtual machines, and restore, onto the target virtual machine, at least a defined process once hosted on the source virtual machine, wherein the health score calculated for each available virtual machine in the subset of the set of available virtual machines is provided using a conformal framework.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for health rank based virtual machine restoration using a conformal framework. With respect to enterprise data protection, solutions need to address two primary responsibilities: at the onset of failure or disaster, restore any running applications, as well as any lost or damaged data; and minimize (if not eliminate) the future occurrence of such failures or disasters. In tackling the latter responsibility, the disclosed method and system leverage health-score assessments to ensure the restoration of virtual machines onto healthy infrastructure. The aforementioned health-score assessments employ clustering to identify, and a conformal framework to rank, healthy hosts onto which virtual machines may be restored.

Figure 1:
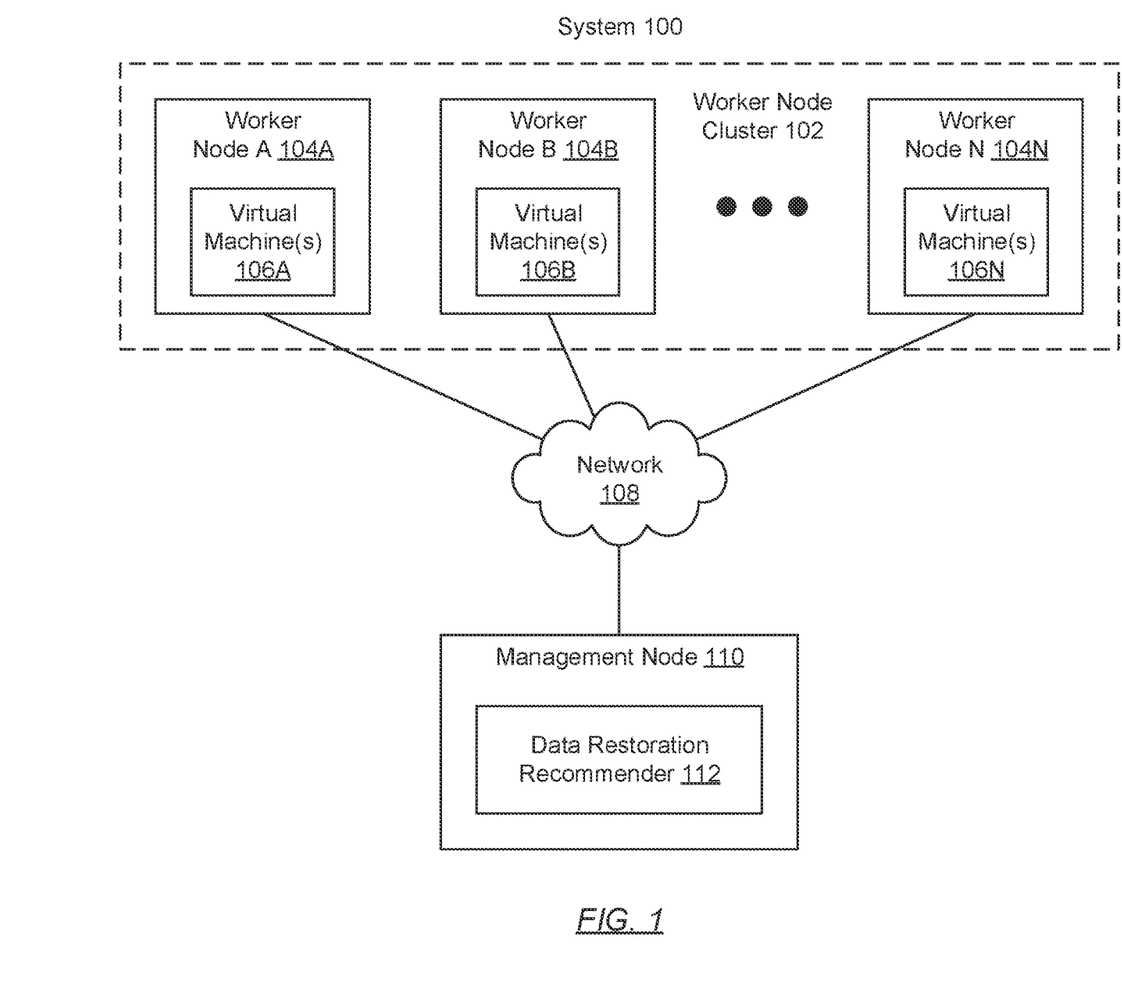
FIG. 1 shows a system in accordance with one or more embodiments of the invention.

FIG. 1 shows a system in accordance with one or more embodiments of the invention. The system (100) may include a worker node cluster (102) operatively connected to a management node (110) through a network (108). Each of these system (100) components is described below.

In one embodiment of the invention, the worker node cluster (102) may represent a collection of worker nodes (104A-104N). In turn, each worker node (104A-104N) may represent any physical appliance or computing system configured to receive, generate, process, and/or transmit data, as well as to provide an environment in which one or more computer programs (e.g., one or more virtual machines (106A-106N) (described below)) may execute thereon. The computer program(s) may, for example, implement large-scale and complex data processing; or implement one or more services offered locally or over the network (108). In providing an execution environment for the computer program(s) running thereon, any worker node (104A-104N) may include and allocate various resources (e.g., computer processors, memory, storage, virtualization, networking, etc.), as needed, for the computer program(s) to consume. One of ordinary skill will appreciate that any worker node (104A-104N) may perform other functionalities without departing from the scope of the invention. By way of examples, a worker node (104A-104N) may be implemented as a server or any other computing system similar to the exemplary computing system shown in FIG. 3.

In one embodiment of the invention, a virtual machine (106A-106N) may refer to a computer program that executes on the underlying hardware of a host computing system (e.g., a worker node (104A-104N)). Specifically, a virtual machine (106A-106N) may refer to a computer program that emulates a physical computing system and, thus, provides a self-contained execution environment on which one or more other computer programs (e.g., guest operating systems, applications, and/or services) may execute. In addition, a virtual machine (106A-106N) may access the underlying host computing system hardware and interact with other subcomponents (e.g., operating system of, utilities on, other computing programs executing on) the host computing system using an abstraction layer—i.e., a virtual machine hypervisor (not shown).

In one embodiment of the invention, the management node (110) may represent any physical appliance or computing system configured to control and manage the worker node cluster (102). To that extent, the management node (110) may include functionality to: allocate resources across the worker node cluster (102); maintain state across the worker node cluster (102); create, delete, or otherwise deploy virtual machines across the worker node cluster (102); and serve as an application programming interface (API) endpoint through which system (100) administrators and/or users may interact with the worker node cluster (102). One of ordinary skill will appreciate that the management node (110) may perform other functionalities without departing from the scope of the invention. Further, the management node (110) may host a data restoration recommender (112) (described below). By way of examples, the management node (110) may be implemented as a server or any other computing system similar to the exemplary computing system shown in FIG. 3.

In one embodiment of the invention, the data restoration recommender (112) may refer to a computer program that executes on the underlying hardware of the management node (110), which may be responsible for implementing health rank based virtual machine restoration using a conformal framework. To that extent, the data restoration recommender (112) may at least perform the method outlined in FIG. 2, below, however, one of ordinary skill will appreciate that the data restoration recommender (112) may perform other functionalities without departing from the scope of the invention.

In one embodiment of the invention, the above-mentioned system (100) components (or subcomponents thereof) may communicate with one another through the network (108) (e.g., a local area network (LAN), a wide area network (WAN) such as the Internet, a mobile network, any other network type, or a combination thereof). The network (108) may be implemented using any combination of wired and/or wireless connections. Further, the network (108) may encompass various interconnected, network-enabled subcomponents (or systems) (e.g., switches, routers, etc.) that may facilitate communications between the above-mentioned system (100) components. Moreover, in communicating with one another, the above-mentioned system (100) components (or subcomponents thereof) may employ any combination of wired and/or wireless communication protocols.

While FIG. 1 shows a configuration of components, other system (100) configurations may be used without departing from the scope of the invention.

Figure 2:
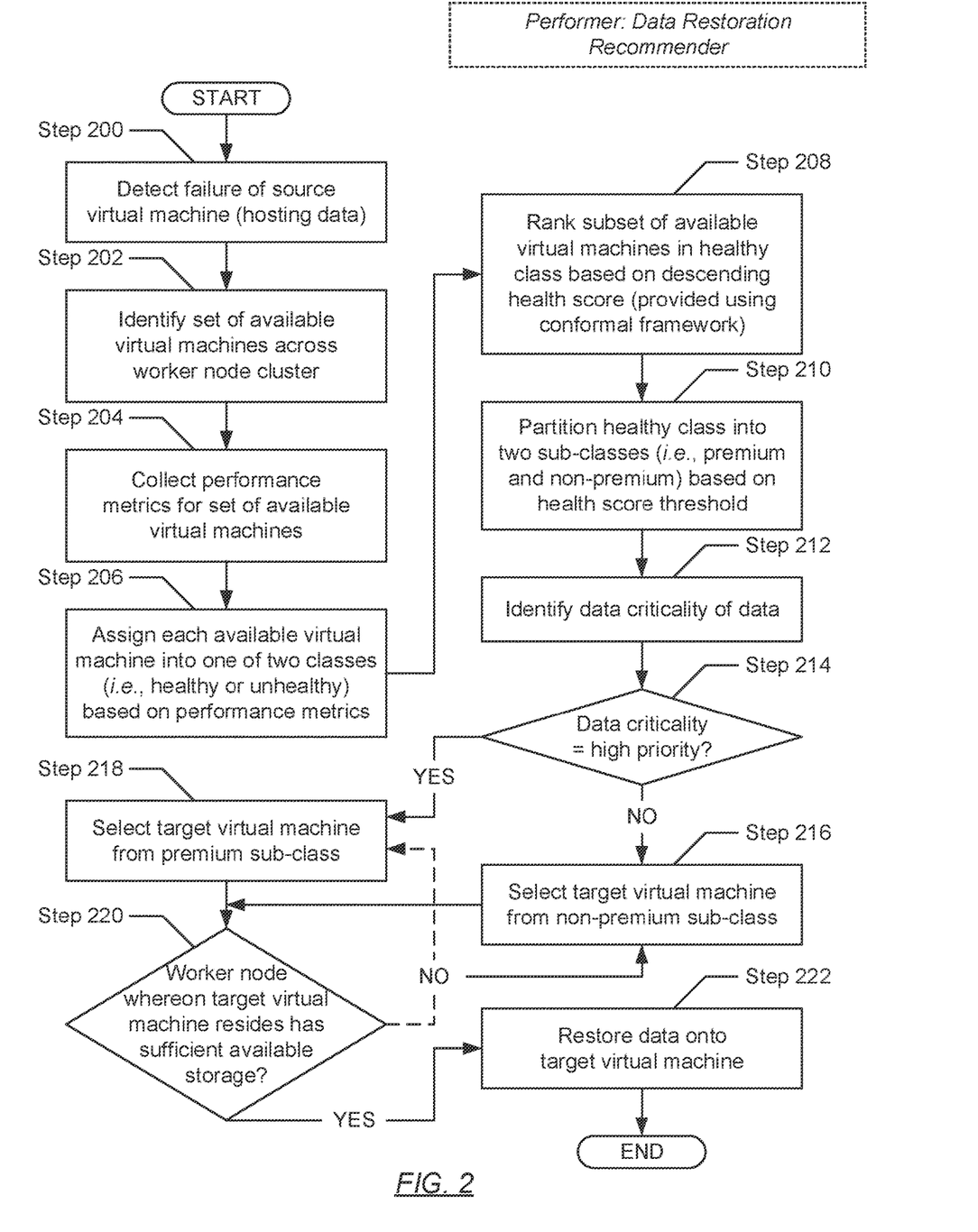
FIG. 2 shows a flowchart describing a method for health rank based virtual machine restoration using a conformal framework in accordance with one or more embodiments of the invention.

FIG. 2 shows a flowchart describing a method for health rank based virtual machine restoration using a conformal framework in accordance with one or more embodiments of the invention. The various steps outlined below may be performed by the data restoration recommender (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, the failure of a source virtual machine is detected. In one embodiment of the invention, the source virtual machine may refer to a self-contained execution environment that may have been hosting a defined process (e.g., guesting operating system, application, service, etc.), and may have been maintaining a collection of data relevant or pertinent to the defined process (i.e., defined process data). Further, the aforementioned failure may have been detected through, for example, the interruption of a heartbeat protocol previously established between the source virtual machine and a management node (see e.g., FIG. 1), the monitoring of event-log associated network traffic routed to the management node from a source worker node on which the source virtual machine had been deployed, any other failure detection methodology or technology, or a combination thereof.

In Step 202, in response to the source virtual machine failure (detected in Step 200), a set of available virtual machines, deployed across a worker node cluster (see e.g., FIG. 1), is identified. In one embodiment of the invention, each available virtual machine may refer to a self-contained execution environment, deployed on a worker node of the worker node cluster, which has yet to host a given defined process and, accordingly, has yet to maintain any data. Further, identification of any given available virtual machine may have been possible through, for example, the continual monitoring and maintenance of worker node cluster state by the management node.

In Step 204, performance metrics, for each available virtual machine of the set of available virtual machines (identified in Step 202), are collected. In one embodiment of the invention, each performance metric may serve as a real-time or historical (i.e., over-time) indicator for: how well any available virtual machine or their hosting worker node may be performing, and what issues may be impacting the performance of any available virtual machine or their hosting worker node. Examples of these performance metrics may include, but are not limited to: virtual machine downtime (i.e., number of times the virtual machine has gone down in a given time period); worker node boot time (i.e., length of time taken to boot the hosting worker node); CPU utilization (i.e., percentage of total computer processor usage by the virtual machine); CPU ready time (i.e., average length of time the virtual machine waits to be scheduled onto a physical CPU core); CPU idle time (i.e., average length of time the physical computer processor core(s) of the hosting worker node remains in an idle state); active memory utilization (i.e., percentage of total computer memory usage by the virtual machine); kernel memory utilization (i.e., percentage of total computer memory usage by the virtual machine kernel); disk read latency (i.e., average length of time taken for the virtual machine to read from a data store); disk write latency (i.e., average length of time taken for the virtual machine to write to a data store); network utilization (i.e., rate at which data transmitted and received across all virtual network adapters connected to the virtual machine); CPU downtime (i.e., number of computer processor cores that have gone down in a given period of time); and memory downtime (i.e., number of computer memory partitions that have failed in a given period of time). One of ordinary skill will appreciate that additional or alternative performance metrics may be used without departing from the scope of the invention.

In Step 206, based on the performance metrics (collected in Step 204), each available virtual machine of the set of available virtual machines (identified in Step 202) is assigned into one of two classes—i.e., a healthy class or an unhealthy class. In one embodiment of the invention, assignment of an available virtual machine into one of the aforementioned classes (versus the other) may rely on the clustering (or grouping) of features (e.g., performance metrics), pertinent to the available virtual machine, within N-dimensional feature space. Clustering (also referred to as cluster analysis) may refer to an unsupervised machine learning classification technique predominantly used to classify objects (e.g., the set of available virtual machines) into relative groups (or clusters). Through clustering, objects placed within a same group are determined to be more similar to each other (based on their features) than to those objects placed within other groups. Accordingly, based on their respective performance metrics, each available virtual machine may be deduced to have relatively good health (i.e., placed within the healthy class or group of available virtual machines) or relatively bad health (i.e., placed within the unhealthy class or group of available virtual machines).

In Step 208, the subset of available virtual machines (assigned in Step 206) within the healthy class is/are ranked, in descending order, based on their respective health score. In one embodiment of the invention, the health score for any given virtual machine may be determined through a conformal framework. The conformal framework may refer to an algorithm-agnostic scheme (i.e., a scheme that can be implemented on or applied over any machine learning algorithm) that associates a reliable measure of confidence with any prediction or classification output derived by any machine learning algorithm. Accordingly, in the instant case of virtual machine classification via clustering, the conformal framework may be applied there-over in order to calculate a confidence value associated with the class within which the virtual machine had been assigned. That is, for a given virtual machine assigned to a given class, the confidence value, provided by the conformal framework, may reflect a mathematically calculated likelihood that the assignment associating the given virtual machine to the given class is reliable or correct. The health score of any given virtual machine may therefore be synonymous with the confidence value, calculated via the conformal framework, associated with assignment of the given virtual machine into a given class—i.e., the healthy class. Implementation of the conformal framework may employ any existing conformal framework method (e.g., transductive, inductive, density-based, etc.).

In Step 210, the healthy class-affiliated available virtual machine(s) (ranked in Step 208) is/are partitioned further into two sub-classes—i.e., a premium sub-class and a non-premium sub-class. In one embodiment of the invention, the two sub-classes may be differentiated through a predefined health score threshold. The health score threshold may reflect a health score (or confidence measurement) value, which may be configured by an administrator of the worker node cluster and may be used to assign a given available virtual machine into one of the two aforementioned sub-classes based on a relativity of the health score for the given available virtual machine to the health score threshold value. More specifically, if the health score of a given available virtual machine matches or exceeds the health score threshold, then the given available virtual machine may be placed or assigned into the premium sub-class. On the other hand, if the health score of a given available virtual machine falls short of or below the health score threshold, then the given available virtual machine may alternatively be placed or assigned into the non-premium sub-class.

In Step 212, a data criticality for the collection of data that had been maintained by the source virtual machine, which had been relevant or pertinent to a defined process hosted thereby, is identified. In one embodiment of the invention, the data criticality of a given data may reflect a level of importance associated with the given data to, for example, the administrators of the worker node cluster, the successful operation of an organization's business or processes, any other specified mission, or a combination thereof.

In Step 214, a determination is made as to whether the data criticality (identified in Step 212), for the collection of data that had been maintained by the source virtual machine, reflects that the collection of data has a high level of importance (or high-priority). In one embodiment of the invention, if it is determined that the data criticality indicates that the collection of data is of high-importance (or priority), then the process proceeds to Step 218. On the other hand, in another embodiment of the invention, if it is alternatively determined that the data criticality indicates that the collection of data is of low-importance (or priority), then the process alternatively proceeds to Step 216.

In Step 216, following the determination (in Step 214) that the data criticality (identified in Step 212), for the collection of data that had been maintained by the source virtual machine, indicates that the collection of data is of low-importance (or priority), a target virtual machine is selected from the subset of available virtual machines assigned to the non-premium sub-class of the healthy class of available virtual machines across the worker node cluster. Specifically, in one embodiment of the invention, a highest ranked available virtual machine of the non-premium sub-class, which has not been previously designated as the target virtual machine (during a previously performed iteration of Step 216), may be selected as the target virtual machine representative of the current iteration of Step 216. From here, the process proceeds to Step 220 (described below).

In Step 218, following the alternative determination (in Step 214) that the data criticality (identified in Step 212), for the collection of data that had been maintained by the source virtual machine, indicates that the collection of data is of high-importance (or priority), a target virtual machine is selected from the subset of available virtual machines assigned to the premium sub-class of the healthy class of available virtual machines across the worker node cluster. Specifically, in one embodiment of the invention, a highest ranked available virtual machine of the premium sub-class, which has not been previously designated as the target virtual machine (during a previously performed iteration of Step 218), may be selected as the target virtual machine representative of the current iteration of Step 218.

In Step 220, a determination is made as to whether a worker node, where the target virtual machine (selected in Step 216 or Step 218) resides, includes enough available storage to accommodate the collection of data that had been maintained by the source virtual machine. In one embodiment of the invention, if it is determined that sufficient storage is available on the worker node hosting the target virtual machine, then the process proceeds to Step 222. On the other hand, in another embodiment of the invention, if it is alternatively determined that insufficient storage is available on the worker node hosting the target virtual machine, then the process either alternatively proceeds to Step 216 or to Step 218.

More specifically, for the above-mentioned latter embodiment, if the data criticality (identified in Step 212) for the collection of data had indicated that the collection of data is of low-importance (or priority), then upon determining that insufficient storage is available on the worker node hosting the target virtual machine, the process proceeds to Step 216. Upon re-visiting Step 216, a new target virtual machine may be selected from the remaining (i.e., yet to be selected) available virtual machine(s) of the non-premium sub-class. Otherwise, if the data criticality for the collection of data had indicated that the collection of data is of high-importance (or priority), then upon determining that insufficient storage is available on the worker node hosting the target virtual machine, the process proceeds to Step 218. Upon re-visiting Step 218, a new target virtual machine may be selected from the remaining (i.e., yet to be selected) available virtual machine(s) of the premium sub-class.

In Step 222, following the determination (in Step 220) that sufficient storage is available on the worker node hosting the target virtual machine (selected in Step 216 or Step 218), the defined process (e.g., guest operating system, application, service, etc.), as well as the relevant or pertinent collection of data thereof, is restored onto the target virtual machine. Thus, substantively, a health rank based restoration (using a conformal framework) of the defined process and associated data, hosted/maintained on the source virtual machine, is performed and completed.

Figure 3:
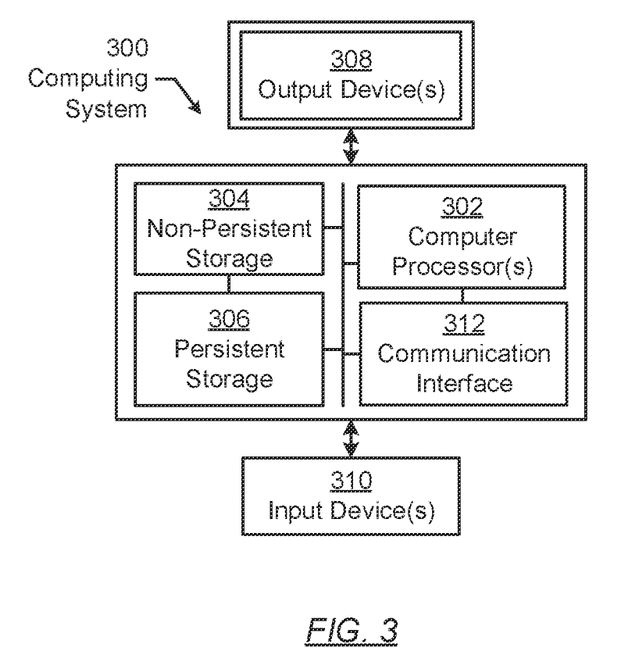
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for virtual machine restoration, comprising:
   detecting a failure of a source virtual machine;
   in response to detecting the failure:
   identifying a set of available virtual machines;
   collecting performance metrics for each available virtual machine in the set of available virtual machines;
   assigning, based on the performance metrics, each available virtual machine in the set of available virtual machines to one selected from a group consisting of a healthy class and an unhealthy class;
   ranking, in descending order and to obtain a ranked subset of available virtual machines, a subset of the set of available virtual machines based on a health score calculated for each available virtual machine in the subset of the set of available virtual machines, wherein each available virtual machine in the ranked subset of available virtual machines is a member of the healthy class;
   selecting a target virtual machine from the ranked subset of available virtual machines; and
   restoring, onto the target virtual machine, at least a defined process once hosted on the source virtual machine,
   wherein the health score calculated for each available virtual machine in the subset of the set of available virtual machines is provided using a conformal framework, and
   wherein assignment of each available virtual machine in the set of available virtual machines, to one selected from the group consisting of the healthy class and the unhealthy class, resulted from machine learning classification performed through cluster analysis.

2. The method of claim 1, wherein the conformal framework associates a confidence value with each assignment mapping an available virtual machine in the subset of the set of available virtual machines to the healthy class.

3. The method of claim 2, wherein the health score, calculated for each available virtual machine in the subset of the set of available virtual machines, comprises the confidence value associated with the assignment mapping the available virtual machine to the healthy class.

4. The method of claim 1, further comprising:
prior to selecting the target virtual machine:
identifying a data criticality associated with the at least defined process once hosted on the source virtual machine,
wherein selection of the target virtual machine is based on the data criticality.

5. The method of claim 4, further comprising:
prior to identifying the data criticality associated with the at least defined process once hosted on the source virtual machine:
partitioning, based on a health score threshold, the healthy class into a premium sub-class and a non-premium sub-class,
wherein the health score, calculated for each available virtual machine that is a member of the premium sub-class, at least matches the health score threshold,
wherein the health score, calculated for each available virtual machine that is a member of the non-premium sub-class, fails to at least match the health score threshold.

6. The method of claim 5, wherein the target virtual machine is selected from available virtual machines of the premium sub-class when the data criticality reflects that the at least defined process is of high-importance.

7. The method of claim 5, wherein the target virtual machine is selected from available virtual machines of the non-premium sub-class when the data criticality reflects that the at least defined process is of low-importance.

8. The method of claim 1, further comprising:
prior to restoring the at least defined process, once hosted on the source virtual machine, onto the target virtual machine:
making a determination that a worker node comprises sufficient available storage to accommodate defined process data pertinent to the at least defined process, wherein the target virtual machine resides on the worker node.

9. A non-transitory computer readable medium (CRM) comprising computer readable program code, which when executed by a computer processor, enables the computer processor to:
detect a failure of a source virtual machine;
in response to detecting the failure:
identify a set of available virtual machines;
collect performance metrics for each available virtual machine in the set of available virtual machines;
assign, based on the performance metrics, each available virtual machine in the set of available virtual machines to one selected from a group consisting of a healthy class and an unhealthy class;
rank, in descending order and to obtain a ranked subset of available virtual machines, a subset of the set of available virtual machines based on a health score calculated for each available virtual machine in the subset of the set of available virtual machines, wherein each available virtual machine in the ranked subset of available virtual machines is a member of the healthy class;
select a target virtual machine from the ranked subset of available virtual machines; and
restore, onto the target virtual machine, at least a defined process once hosted on the source virtual machine,
wherein the health score calculated for each available virtual machine in the subset of the set of available virtual machines is provided using a conformal framework, and
wherein assignment of each available virtual machine in the set of available virtual machines, to one selected from the group consisting of the healthy class and the unhealthy class, resulted from machine learning classification performed through cluster analysis.

10. The non-transitory CRM of claim 9, wherein the conformal framework associates a confidence value with each assignment mapping an available virtual machine in the subset of the set of available virtual machines to the healthy class.

11. The non-transitory CRM of claim 10, wherein the health score, calculated for each available virtual machine in the subset of the set of available virtual machines, comprises the confidence value associated with the assignment mapping the available virtual machine to the healthy class.

12. The non-transitory CRM of claim 9, further comprising computer readable program code, which when executed by the computer processor, further enables the computer processor to:
prior to selecting the target virtual machine:
identify a data criticality associated with the at least defined process once hosted on the source virtual machine,
wherein selection of the target virtual machine is based on the data criticality.

13. The non-transitory CRM of claim 12, further comprising computer readable program code, which when executed by the computer processor, further enables the computer processor to:
prior to identifying the data criticality associated with the at least defined process once hosted on the source virtual machine:
partition, based on a health score threshold, the healthy class into a premium sub-class and a non-premium sub-class,
wherein the health score, calculated for each available virtual machine that is a member of the premium sub-class, at least matches the health score threshold,
wherein the health score, calculated for each available virtual machine that is a member of the non-premium sub-class, fails to at least match the health score threshold.

14. The non-transitory CRM of claim 13, wherein the target virtual machine is selected from available virtual machines of the premium sub-class when the data criticality reflects that the at least defined process is of high-importance.

15. The non-transitory CRM of claim 13, wherein the target virtual machine is selected from available virtual machines of the non-premium sub-class when the data criticality reflects that the at least defined process is of low-importance.

16. The non-transitory CRM of claim 9, further comprising computer readable program code, which when executed by the computer processor, further enables the computer processor to:
prior to restoring the at least defined process, once hosted on the source virtual machine, onto the target virtual machine:
make a determination that a worker node comprises sufficient available storage to accommodate defined process data pertinent to the at least defined process, wherein the target virtual machine resides on the worker node.

* * * * *